United States Patent
Silakov

(10) Patent No.: US 11,231,986 B1
(45) Date of Patent: Jan. 25, 2022

(54) SYSTEMS AND METHODS FOR COLLECTING OPTIMAL SET OF LOG FILES FOR ERROR REPORTS

(71) Applicant: Virtuozzo International GmbH, Schaffhausen (CH)

(72) Inventor: Denis Silakov, Moscow (RU)

(73) Assignee: Virtuozzo International GmbH, Schaffhausen (CH)

( * ) Notice: Subject to any disclaimer, the term of this patent is extended or adjusted under 35 U.S.C. 154(b) by 0 days.

(21) Appl. No.: 17/085,994

(22) Filed: Oct. 30, 2020

(51) Int. Cl.
*G06F 11/07* (2006.01)

(52) U.S. Cl.
CPC ........ *G06F 11/079* (2013.01); *G06F 11/0775* (2013.01); *G06F 11/0778* (2013.01)

(58) Field of Classification Search
CPC ............. G06F 11/0778; G06F 11/0775; G06F 11/079; G06F 11/3636; G06F 11/366; G06F 11/3466
See application file for complete search history.

(56) References Cited

U.S. PATENT DOCUMENTS

| | | | |
|---|---|---|---|
| 9,535,780 B2* | 1/2017 | Rajamanickam | G06F 11/0706 |
| 2007/0283338 A1* | 12/2007 | Gupta | G06F 11/36 717/154 |
| 2012/0137182 A1* | 5/2012 | Zhang | G06F 11/0778 714/48 |
| 2013/0081000 A1* | 3/2013 | Robinson | G06F 11/3692 717/127 |
| 2019/0121719 A1* | 4/2019 | Hamon | G06F 11/3664 |
| 2020/0334093 A1* | 10/2020 | Dubey | G06F 11/0778 |

* cited by examiner

*Primary Examiner* — Matthew M Kim
*Assistant Examiner* — Kurosu Risa Altaf
(74) *Attorney, Agent, or Firm* — Arent Fox LLP; Michael Fainberg

(57) ABSTRACT

Disclosed herein are systems and method for collecting an optimal set of log files for generating error reports. In one aspect, a method may comprise detecting an error in a software component and retrieving a function call trace associated with the software component. The method may comprise comparing the retrieved function call trace with a plurality of known call traces, wherein each respective known call trace of the plurality of known call traces is associated with a respective set of log files to be collected for error analysis. The method may comprise identifying, based on the comparison, a known call trace for which a similarity value with the retrieved function call trace is greater than a threshold similarity value. The method may comprise collecting a set of log files for the error based on an associated set of log files for the known call trace and generating an error report.

20 Claims, 4 Drawing Sheets

SYSTEMS AND METHODS FOR COLLECTING OPTIMAL SET OF LOG FILES FOR ERROR REPORTS

FIELD OF TECHNOLOGY

The present disclosure relates to the field of software error analysis, and, more specifically, to systems and methods for collecting an optimal set of log files for generating error reports.

BACKGROUND

Software programs commonly have bugs that lead to abnormal software component (e.g., application or system tool) behavior and crashes under certain conditions. To effectively analyze such errors, it is important to quickly react to the errors and collect information needed for debugging. Most crashes occur during the development cycle of the software component (e.g., application), when the software component (e.g., application) is subjected to different tests for stability and performance. Some crashes occur on the customer's side, when the software is already released to production. In both cases, crashes are analyzed by developers to identify and fix the underlying problems.

For such an analysis to be effective, it is important to collect comprehensive information about the incident such as software component (e.g., application) name, arguments, environment variables, function call trace, etc. This information forms a crash report and is often gathered automatically by crash processing tools. An important component of crash reports are log files (or journal files) of the crashed application and/or the system as a whole. Log files help to identify what was happening in the operating system and inside the application itself when an error occurred.

In modern systems, however, the size of journals and log files can be significantly large—containing several gigabytes of textual data. It is unreasonable to collect all possible log files for every crash because this increases the size of crash reports and does not necessarily help developers to find the issue. In fact, due to the overwhelming size of data, collecting all possible log files may make it even more difficult to debug.

Accordingly, there exists a need to select, for a particular crash, a set of log files that can decrease the amount of information collected for crash analysis without missing important data.

SUMMARY

As software systems grow in complexity and size, the number of possible error scenarios is also dramatically increasing. It would take a significant amount human resources to manually specify sets of logs files that should be collected in every possible case, especially for system-wide tools where developers do not have control over the code of programs that run in the system.

To address these shortcomings, aspects of the disclosure describe methods and systems for collecting an optimal set of log files for generating error reports. More specifically, the methods and systems automatically analyze if data in the log file is useful (and so may be included in the report) or not depending on the error.

In one exemplary aspect, a method for collecting log files for error reporting may comprise detecting an error in a software component. In response to detecting the error, the method may comprise retrieving a function call trace comprising a sequence of functions executed in the software component within a period of time prior to the error. The method may comprise comparing the retrieved function call trace with a plurality of known call traces, wherein each respective known call trace of the plurality of known call traces is associated with a respective set of log files to be collected for error analysis. The method may comprise identifying, based on the comparison, a known call trace for which a similarity value with the retrieved function call trace is greater than a threshold similarity value. The method may comprise collecting a set of log files for the error based on an associated set of log files for the known call trace. The method may comprise generating an error report comprising the collected set of log files.

In some aspects, an amount of log files in the collected set of log files is less than an amount of total log files retrievable for the error for the period of time.

In some aspects, the method for comparing the retrieved function call trace with the plurality of known call traces may comprise determining, for each respective known call trace of the plurality of known call traces, a respective similarity value using a comparison algorithm (e.g., position dependent model (PDM) or any other algorithm that is able to compute call trace similarity) that accepts inputs comprising: (1) positions of common functions in the respective known call trace and the retrieved function call trace, and (2) differences in positions of common functions in the respective known call trace and the retrieved function call trace.

In some aspects, prior to comparing the retrieved function call trace with the plurality of known call traces, the method may comprise obtaining parameters of the comparison algorithm, wherein the parameters comprise a distance weight, an alignment offset weight, and the threshold similarity value.

In some aspects, the method may comprise iteratively determining the distance weight, the alignment offset weight, and the threshold similarity value using a machine learning algorithm configured to (1) compare at least one test call trace with the plurality of known call traces, wherein required sets of log files of the at least one test call trace are pre-identified, and (2) adjust the distance weight, the alignment offset weight, and the threshold similarity value such that an output of the comparison algorithm is indicative of the required sets of log files.

In some aspects, prior to comparing the retrieved function call trace with the plurality of known call traces, the method may comprise removing recursive function calls from the retrieved function call trace.

In some aspects, prior to comparing the retrieved function call trace with the plurality of known call traces, the method may comprise unifying functions in the retrieved function call trace that have corresponding bodies.

In some aspects, prior to comparing the retrieved function call trace with the plurality of known call traces, the method may comprise appending name or version of the software component or a name of an RPM package of the software component to the retrieved function call trace.

It should be noted that the methods described above may be implemented in a system comprising a hardware processor. Alternatively, the methods may be implemented using computer executable instructions of a non-transitory computer readable medium.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for collecting an optimal set of log files for generating error reports. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
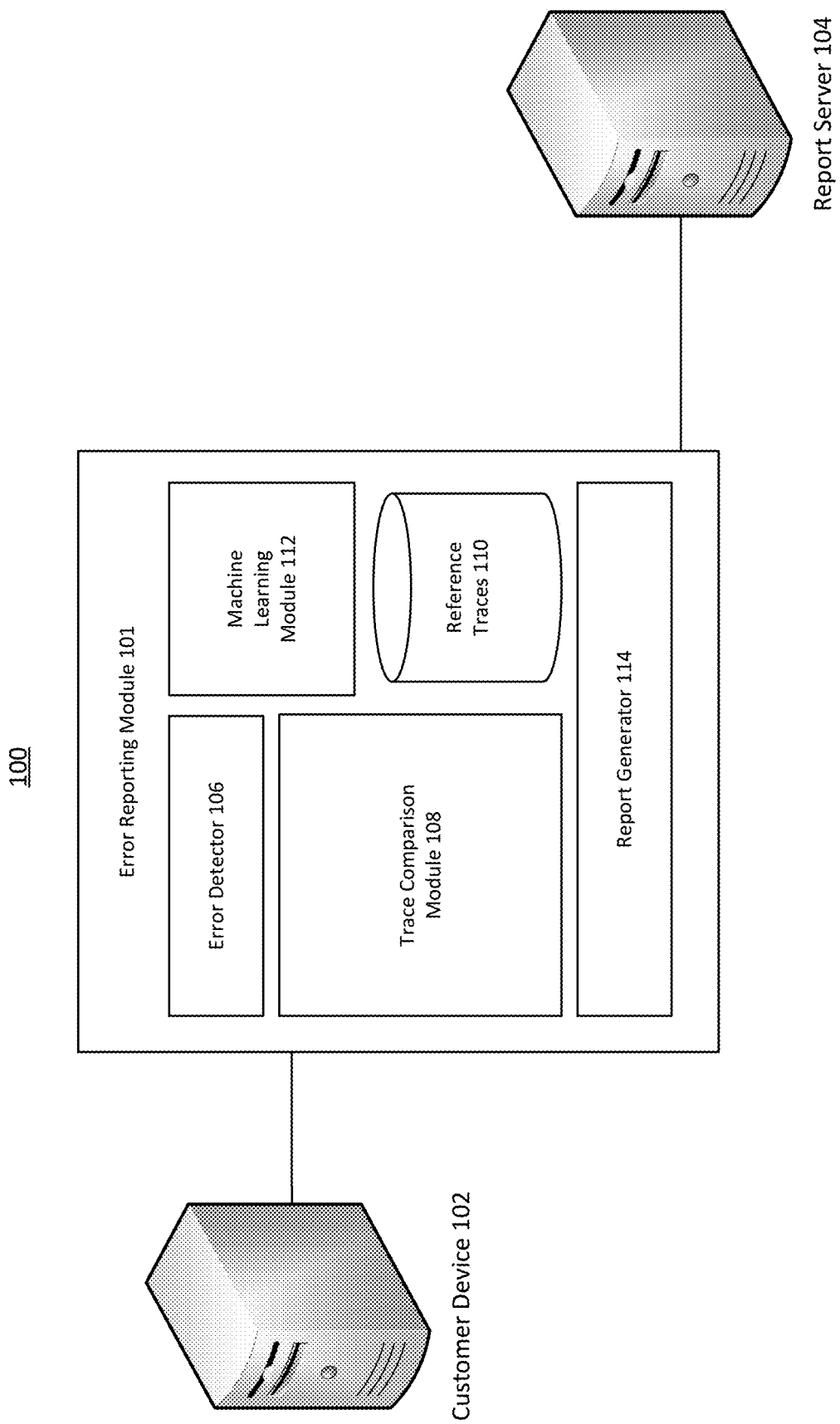
FIG. 1 is a block diagram illustrating a system for collecting an optimal set of log files for generating error reports.

FIG. 1 is a block diagram 100 illustrating system for collecting an optimal set of log files for generating error reports. The system may comprise error reporting module 101 and a computing device (or devices) on which the error reporting module 101 (or parts of the module) runs. Customer device 102 may be any device where a software error may occur. Example customer devices include but are not limited to computers, servers, laptops, smartphones, smart speakers, and other physical computing devices. When an error is detected on customer device 102, the error report including various log files is transmitted to report server 104. Report server 104, although depicted as a server, may be any device that is capable of receiving log reports and, optionally, storing, further analyzing or presenting them. For example, the report server 104 presents the log files to the developer of the software that experienced an error on customer device 102. The developer may then identify the issues in the installed version of the software on customer device 102 and release a patch that resolves the identified issues.

As discussed previously, however, sending any arbitrary log file to report server 104 may not help the developer efficiently identify the issues. Accordingly, the present disclosure discloses error reporting module 101. Error reporting module 101 may be software that is installed on customer device 102 that selects logs to include in an error report and sends them to report server 104. Error reporting module 101 may include a plurality of components or sub-modules such as one or more of: error detector 106, trace comparison module 108, reference traces 110, machine learning module 112, and report generator 114. In a high overview, error detector 106 may receive an indication that an error has occurred on customer device 102. Errors may include a crash (e.g., a software has terminated when it should not have), a freeze (e.g., a software is unresponsive to any inputs), or any other malfunction where the software has shown an unexpected outcome. Error detector 106 may retrieve a function call trace comprising a sequence of functions executed in the software associated with the error. Trace comparison module 108 is a module that compares the retrieved function call trace with a plurality of known call traces stored in reference traces 110 based on distance and alignment offset between functions in the respective call traces, and outputs a set of log files (e.g., names of log files) to be included in an error report. Module 108 may perform calculations using a comparison algorithm (e.g., a position dependent model (PDM) or any other algorithm usable to measure similarity between two stack traces).

The error report is generated by report generator 114, which collects the identified logs and puts them (the log files with all their content) in the report, and, additionally, formalizes them during adding into the report. To improve the ability of a comparison algorithm (e.g., PDM) to compare traces, the parameters of the a comparison algorithm (e.g., PDM) are optimized using machine learning module 112.

In the overview discussed, all processing is performed on customer device 102 and an error report is transmitted to report server 104. In some aspects, however, error report module 101 is split into a thin and thick client. For example a thin client of error reporting module 101 may be installed on customer device 102, comprising error detector 106 and report generator 114. A thick client of error reporting module 101 may be installed on report server 104 and may include trace comparison module 108, reference traces 110, and machine learning module 112. In this setup, in response to detecting an error, customer device 102 may transmit a function call trace associated with the error to report server 104. Report server 104 may use the components of the thick client and respond to customer device 102 with an indication of the logs that report generator 114 should collect and send back.

In one aspect, a set of all log files that can be collected may be predefined by developers and may depend on the nature of the software component (e.g., whether the software component is an application or a system component, or depending the language on which thew software component is written, or the purpose for which the component is used for, etc.). It also may depend on which log files are available in the computing environment in which the software component runs. In case of tools aimed to collect data for a certain software application (e.g., Mozilla Crash Reporter which is launched once Firefox browser closes unexpectedly), this set includes logs of application and some general system information (e.g., operating system name and version, hardware properties, etc.). On the opposite, system-wide tools aimed to detect crashes of any process in the operating system (e.g., Windows Error Reporting service or RedHat Automatic Bug Reporting Tool) can collect memory dump of the failed process, but not logs or journals specific to particular application—just because they cannot be aware of logs that are created by every program installed in the system. Such tools only collect system-wide journals and general information.

To make error reports more useful, it is necessary to analyze which available information is really required for analysis, which data is superfluous, and which should be added. I.e., the module 101 shall determine which log files from all available/collectable log files are really needed.

In many existing tools, there is some flexibility in choosing data to be included into the error report depending on incident details. For example, if problematic program is written in Java or Python then Java or Python Runtime Environment are requested correspondingly for an error trace of the failure. However, such logic is programmed by developers on the basis of their own experience or requests from other interested parties—that is, if during error analysis developers discover that for certain kind of problems it would be useful to collect some additional files then they explicitly request adding such files to the error reports in certain cases.

As software systems grows in complexity and size, the number of possible error scenarios is also dramatically increasing. It would take too many human resources to manually specify sets of logs files that should be collected in every possible case, especially for system-wide tools where developers do not have control over the code of programs that run in the system. So there is a need to automatically analyze if data included in the reports is useful or not in every particular case.

In module 101, error detector 106 of error reporting module 101 may detect an error (e.g., a crash) in a software component (e.g., application (e.g., a web browser) or a system component (e.g., driver)). In response to detecting the error, error detector 106 may retrieve a function call trace comprising a sequence of functions executed in the software component within a period of time prior to the error. To distinguish one error report from another, the function call trace (also referred as error trace) is used as a unique error identifier. The function call trace represents a sequence of function names which were called just before the error occurred. In some aspects, the absolute or relative addresses of the functions, and/or the values of function arguments are taken into account by error detector 106.

Trace comparison module 108 may compare, using a comparison algorithm (e.g., PDM or any other algorithm), the retrieved function call trace with a plurality of known call traces stored in reference traces 110, wherein each respective known call trace of the plurality of known call traces is associated with a respective set of log files to be collected for error analysis. The algorithm may use for example, uses at least one of the two characteristics of the call traces: (1) distance to the top frame, which is the position of a function in the trace, and (2) alignment offset, which is the difference in position of the same function in traces to be compared. In one aspect, the algorithm is a PDM uses both. In some aspects, the algorithm may require recursive function calls to be removed from the trace. Accordingly, prior to comparing call traces, error detector 106 may remove recursive function calls from the retrieved function call trace by truncating the call trace once a recursive function call is met.

Figure 2:
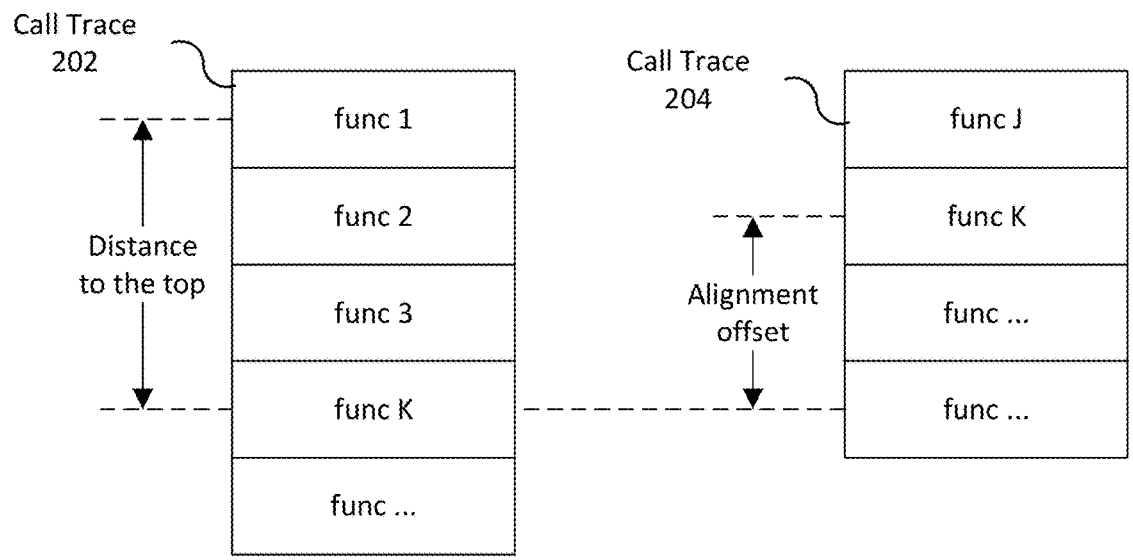
FIG. 2 is a diagram illustrating distance and alignment offset determination.

FIG. 2 is diagram 200 illustrating distance and alignment offset determination. In FIG. 2, two function call traces are depicted. The first is call trace 202, which may be retrieved by error detector 106, and the other is call trace 204, which may be retrieved from reference traces 110. Trace comparison module 108 may determine, for each respective known call trace of the plurality of known call traces (e.g., in reference traces 110). For example, using the comparison algorithm (e.g., PDM), module 108 may identify the positions of functions in the respective known call trace and the retrieved function call trace, and may determine differences in positions of shared/common (i.e., those that are included in both compared stacks) functions in the respective known call trace and the retrieved function call trace.

As shown in FIG. 2, call trace 202 and call trace 204 both include function K. Distance is counted on the basis of common function subsequences. Thus, for every common function, the comparison algorithm can be used to calculate a distance to the top of the trace and an alignment offset between traces. These values are included in the distance formula with weights. In some aspects, machine learning module 112 is used to select optimal values for these weights. In FIG. 2, the distance to the top in call trace 202 for function K is 4. The alignment offset between function K in call trace 202 and call trace 204 is 2. The distance to the top in call trace 204 for function K is 2.

In case where the comparison algorithm is a PDM, functions with lower distance gets higher weight during comparison. Similarity between two call traces $C_1$ and $C_2$ is defined as follows. Let L be the set of all the common sequences of function names between trace 202 and 204. Let $L_i$ be one of the common sequences comprising $f_{i1}, f_{i2}, \ldots f_{ik}$ matched functions:

$$L=\{L_1, L_2, L_3, \ldots\}$$

$$L_i=\{f_{i1}, f_{i2}, \ldots, f_{ik}\}$$

Let $Pos(C_q, f_{ik})$ be the position of function $f_{ik}$ in the error trace $C_q$, l be the minimum of the number of function in traces $C_1$ and $C_2$. The similarity between the error traces $C_1$ and $C_2$ is then defined using the following equation:

$$sim(C1, C2) = \frac{\max Li \in L(Q(Li))}{\sum_{j=1}^{l} e^{-cj}},$$

where l is a minimum number of functions in $C_1$ and $C_2$, and $$Q(Li)=\Sigma_{fik \in Li} e^{-c\, min(Pos(C1,fik),Pos(C2,fik))} * e^{-o|Pos(C1,fik)-Pos(C2,fik)|},$$

Here c is a weight for the distance and o is a weight for the alignment offset. As discussed previously, these weights are learned using machine learning module 112.

In one aspect, the machine learning module 112 is used to compute parameters and/or weights for the comparing algorithm. For example, the computation is performed based on the training set of data—set of call traces with the sets of names of log files that have been associated with the traces.

Consider an example in which $C_1$ is $\{f_1, f_2, f_3\}$ and $C_2$ is $\{f_2, f_1, f_3\}$, there are two common subsequences ($f_1, f_3$ and $f_2, f_3$). For any of them, similarity gets the following value:

$$sim(C1, C2) = \frac{e^{-c} * e^{-o} + e^{-3c}}{e^{-c} + e^{-2c}},$$

and whichever non-negative values for c and o are set, the similarity will always be less than 1. Nevertheless, the values for c and o weights need to be optimized and set to handle not so obvious cases.

In some aspects, generating all possible common subsequences and calculating Q(L) for them has exponential complexity as a worst case number of such subsequences is equal to $2^N-1$, where N is the length of the largest trace. With N=10, this is quite acceptable, but with N=30 (not a rare case for real traces), calculation can become rather long.

Accordingly, for lengthy traces (e.g., where N is greater than a threshold size), module 108 calculates a similarity matrix M, which is defined of $N_1 \times N_2$ size, where $N_1$ is the length of $C_1$ and $N_2$ is the length of $C_2$. Every element M[i,j] represents the similarity between two subsequences. The first subsequence is from the beginning to the i-th element in $C_1$ (e.g., designated as $f_{1i}$), and the second one is from the top frame to the j-th function in $C_2$ (e.g., $f_{2j}$).

To get similarity value sim(C1, C2), module 108 calculates $M[N_1, N_2]$ element of the matrix. This calculation, which has a complexity of $N_1 \times N_2$, is performed progressively using the following formula:

$$M[i,j]=\max(M[i-1,j],M[i,j-1],M[i-1,j-1]+cost(i,j)),$$

where cost(i,j) is set to 0 if $f_{1i}=f_{2j}$, otherwise it is calculated as $$cost(i,j)=e^{-c*min(i,j)}*e^{-o*|i-j|}$$

In some aspects, in order to find similarity between the given function call trace and set of known traces, module 108 pre-processes the function call trace to make it suitable for the comparison algorithm and to eliminate items which are not important for similarity analysis but can only increase work time of the algorithm. For example, as mentioned previously, recursive function calls are eliminated by truncating the trace once the same function is met. In some aspects, module 108 unifies functions in the retrieved function call trace that have corresponding bodies. For example, names of functions known to have similar bodies are unified because some functions can be simple wrappers around the same routine or have minor differences in functionality. In some aspects, module 108 may append name and/or version of the software component, and some additional information (e.g., an RPM package name of the software component in case where the software component was delivered as RPM package, etc.) to the retrieved function call trace (e.g., to the top of the call trace). The latter step is performed to make traces of the same process or processes from the same software component (e.g., application) to have traces with higher similarity than with processes of other components. The rationale is that often set of logs that should be collected for error analysis depend on the software component application name.

In some aspects, subsequent to the function call trace being normalized using some (e.g., one, all or none, etc.) of these pre-processing steps, the comparison algorithm (e.g., PDM) is used by module 108 to compare the function call trace with known traces in reference traces 110 (i.e., calculate its similarity values with every trace from the known set using the PDM approach discussed above). Module 108 then identifies, based on the comparison, a known call trace for which a similarity value with the retrieved function call trace is greater than a threshold similarity value R.

Report generator 114 subsequently collects a set of log files (i.e., files themselves) for the error based on an associated set of log files (names of files to be collected) for the known call trace. Wherein, in one aspect, the collected set of log files comprise usage information of the software component. Because only the log files of relevance to a particular error are collected, an amount of log files in the collected set of log files is less than an amount of total log files retrievable for the error for the period of time. Report generator 114 then generates an error report comprising the collected set of log files. For example, a virtual machine process may crash and files of this VM may be located on distributed storage. In the event of VM process crashes, all logs related to the hypervisor and the logs related to storage can be collected. However, if the VM was not performing any operations with disk I/O, then the storage logs are not required.

In some aspects, there may be multiple known traces that have a similarity value greater than the threshold similarity value. Accordingly, a union of all logs associated with the identified known traces are collected. The union for function call trace $C_k$ can be represented as $$Logs(Ck) = \bigcup_{j:sim(Cj,Ck) \geq R} Logs(Cj)$$

As discussed, module 108 determines and evaluates similarity using the comparison algorithm (e.g., PDM), which comprises a distance weight c, an alignment offset weight o, and the threshold similarity value R. To determine the optimal values for these weights, error reporting module 101 uses machine learning module 112. Module 112 iteratively determines the distance weight, the alignment offset weight, and the threshold similarity value using a machine learning algorithm configured to compare at least one test call trace with the plurality of known call traces, wherein required sets of log files of the at least one test call trace are pre-identified. The algorithm is further configured to adjust the distance weight, the alignment offset weight, and the threshold similarity value such that an output of the comparison algorithm (e.g., PDM) is indicative of the required sets of log files.

Figure 3:
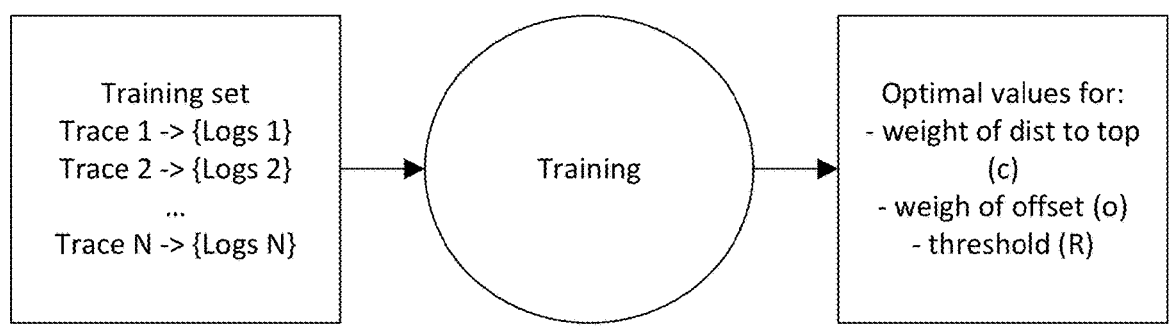
FIG. 3 is a diagram illustrating training via the machine learning module.

FIG. 3 is diagram 300 illustrating training via machine learning module 112. A training set comprises traces and their identified logs (e.g., names of those logs, that are deemed useful for solving this error) are entered in machine learning module 112, which outputs the optimal values of c, o, and R. Values of c, o and R vary independently. To find their optimal values, machine learning module 112 may implement a search-based algorithm which exhaustively checks different possible combinations of these parameters.

In one aspect, machine learning module 112 may run three nested loop cycles for c, o and R correspondingly. In every cycle, possible values in a range for a corresponding parameter are iterated with some small step. For every combination of coefficient values, machine learning module 112 calculates similarities between all traces from a training set and estimates a satisfaction value with the results. For the latter purpose, machine learning module 112 uses a standard approach to calculate a $F_1$ score (also known as F-measure or F-score) for every result. The formula $F_B$ is $$FB = \frac{(1+B^2)*TP}{(1+B^2)*TP+B^2*FN+FP}$$

Where TP stands for the number of true positive decisions, FN stands for the number of false negatives, and FP stands for the number of false positives. In the present disclosure, true positive means that if two error traces require the same logs for analysis, then the similarity value between them is greater or equal to R. If the calculated similarity value for such traces is less than R then this is a false negative decision. Finally, false positive means that the similarity value is greater or equal to R while the traces require different logs for analysis. Depending on the value of B, the measured false negatives can either get more weight (if B>1) or be attenuated. In some aspects, instead of $F_1$ score (with B=1), $F_2$ or $F_{0.5}$ measures can be used. $F_1$ score takes values from 0 to 1, where larger values are preferred.

In one aspect, for the training process, module 112 may select a first amount of traces (e.g., 2000 error traces) for which necessary log files (e.g., a list of log file names) were identified by developers of various software component. In some aspects, a second amount of traces (e.g., 1000) may be used as test data by module 112. The mean size of these traces may be 30 functions. When iterating through values of c, o and R parameters, module 112 may use a step (e.g., 0.05). If 2000 training traces are used, a step of 0.05 results in $20^3=8000$ similarity calculations.

Figure 4:
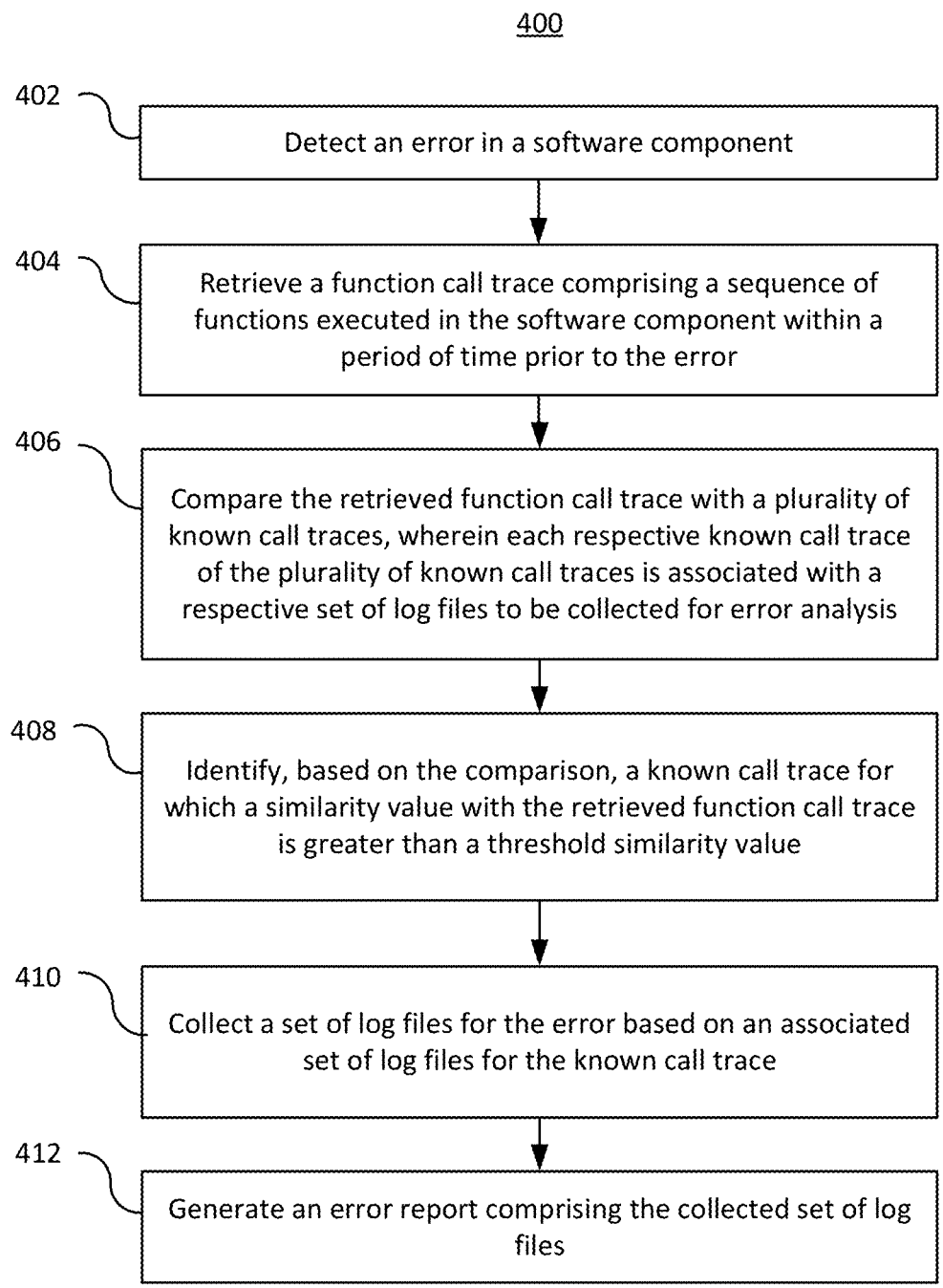
FIG. 4 illustrates a flow diagram of a method for collecting an optimal set of log files for generating error reports, in accordance with aspects of the present disclosure.

FIG. 4 illustrates a flow diagram of method 400 for collecting an optimal set of log files for generating error reports, in accordance with aspects of the present disclosure. At 402, module 101 detects an error in a software component. At 404, module 101 retrieves a function call trace comprising a sequence of functions executed in the software component within a period of time prior to the error. At 406, module 101 compares the retrieved function call trace with a plurality of known call traces, wherein each respective known call trace of the plurality of known call traces is associated with a respective set of log files to be collected for error analysis. At 408, module 101 identifies, based on the comparison, a known call trace (or a set of call traces) for which a similarity value with the retrieved function call trace is greater than a threshold similarity value. At 410, module 101 collects a set of log files for the error based on an associated set of log files for the known call trace. At 412, module 101 generates an error report comprising the collected set of log files.

In one aspect, collected set of log files comprise functionality and usage information of the software component within the period of time. In another aspect, a log file is a file that records either events that occur in an operating system or other software runs, or messages between different users of a communication software. In yet another aspect, log files may comprise any information about to events, actions, warnings, errors, system messages, and etc. related to the computing environment, the software component, etc.

Figure 5:
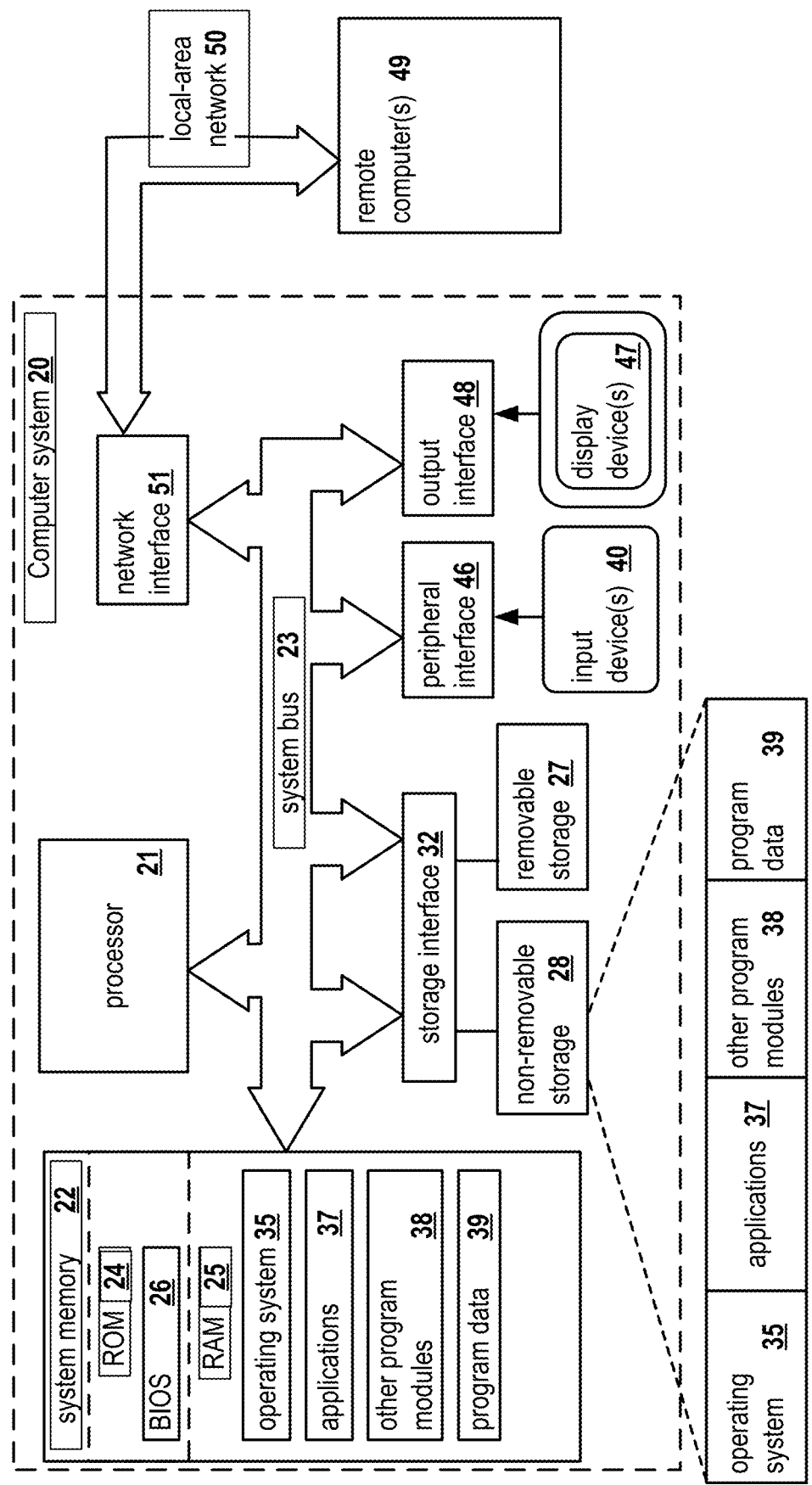
FIG. 5 presents an example of a general-purpose computer system on which aspects of the present disclosure can be implemented.

FIG. 5 is a block diagram illustrating a computer system 20 on which aspects of systems and methods for collecting an optimal set of log files for generating error reports may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, HyperTransport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-4 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for collecting log files for error reporting, the method comprising:
   detecting an error in a software component;
   in response to detecting the error, retrieving a function call trace comprising a sequence of functions executed in the software component within a period of time prior to the error;
   comparing the retrieved function call trace with a plurality of known call traces, wherein each respective known call trace of the plurality of known call traces is associated with a respective set of log files to be collected for error analysis;
   identifying, based on the comparison, a known call trace for which a similarity value with the retrieved function call trace is greater than a threshold similarity value;

collecting a set of log files for the error based on an associated set of log files for the known call trace; and
generating an error report comprising the collected set of log files.

2. The method of claim 1, wherein an amount of log files in the collected set of log files is less than an amount of total log files retrievable for the error for the period of time.

3. The method of claim 1, wherein comparing the retrieved function call trace with the plurality of known call traces comprises:
determining, for each respective known call trace of the plurality of known call traces, a respective similarity value using a comparison algorithm that accepts inputs comprising:
(1) positions of common functions in the respective known call trace and the retrieved function call trace, and
(2) differences in positions of common functions in the respective known call trace and the retrieved function call trace.

4. The method of claim 3, further comprising:
prior to comparing the retrieved function call trace with the plurality of known call traces, obtaining parameters of the comparison algorithm, wherein the parameters comprise a distance weight, an alignment offset weight, and the threshold similarity value.

5. The method of claim 4, further comprising:
iteratively determining the distance weight, the alignment offset weight, and the threshold similarity value using a machine learning algorithm configured to:
compare at least one test call trace with the plurality of known call traces, wherein required sets of log files of the at least one test call trace are pre-identified; and
adjust the distance weight, the alignment offset weight, and the threshold similarity value such that an output of the comparison algorithm is indicative of the required sets of log files.

6. The method of claim 1, further comprising prior to comparing the retrieved function call trace with the plurality of known call traces, removing recursive function calls from the retrieved function call trace.

7. The method of claim 1, further comprising prior to comparing the retrieved function call trace with the plurality of known call traces, unifying functions in the retrieved function call trace that have corresponding bodies.

8. The method of claim 1, further comprising prior to comparing the retrieved function call trace with the plurality of known call traces, appending to the retrieved function call trace at least one of a name, a version of the software component, and a name of RPM package of the software component.

9. A system for collecting log files for error reporting, the system comprising:
a hardware processor configured to:
detect an error in a software component;
in response to detecting the error, retrieve a function call trace comprising a sequence of functions executed in the software component within a period of time prior to the error;
compare the retrieved function call trace with a plurality of known call traces, wherein each respective known call trace of the plurality of known call traces is associated with a respective set of log files to be collected for error analysis;
identify, based on the comparison, a known call trace for which a similarity value with the retrieved function call trace is greater than a threshold similarity value;
collect a set of log files for the error based on an associated set of log files for the known call trace; and
generate an error report comprising the collected set of log files.

10. The system of claim 9, wherein an amount of log files in the collected set of log files is less than an amount of total log files retrievable for the error for the period of time.

11. The system of claim 9, wherein that hardware processor is further configured to compare the retrieved function call trace with the plurality of known call traces by:
determining, for each respective known call trace of the plurality of known call traces, a respective similarity value using a comparison algorithm that accepts inputs comprising:
(1) positions of common functions in the respective known call trace and the retrieved function call trace, and
(2) differences in positions of common functions in the respective known call trace and the retrieved function call trace.

12. The system of claim 11, wherein the hardware processor is further configured to:
prior to comparing the retrieved function call trace with the plurality of known call traces, obtaining parameters of the comparison algorithm, wherein the parameters comprise a distance weight, an alignment offset weight, and the threshold similarity value.

13. The system of claim 12, wherein the hardware processor is further configured to:
iteratively determine the distance weight, the alignment offset weight, and the threshold similarity value using a machine learning algorithm configured to:
compare at least one test call trace with the plurality of known call traces, wherein required sets of log files of the at least one test call trace are pre-identified; and
adjust the distance weight, the alignment offset weight, and the threshold similarity value such that an output of the comparison algorithm is indicative of the required sets of log files.

14. The system of claim 9, wherein the hardware processor is further configured to, prior to comparing the retrieved function call trace with the plurality of known call traces, remove recursive function calls from the retrieved function call trace.

15. The system of claim 9, wherein the hardware processor is further configured to, prior to comparing the retrieved function call trace with the plurality of known call traces, unify functions in the retrieved function call trace that have corresponding bodies.

16. The system of claim 9, wherein the hardware processor is further configured to, prior to comparing the retrieved function call trace with the plurality of known call traces, append to the retrieved function call trace at least one of a name, a version of the software component, and a name of RPM package of the software component.

17. A non-transitory computer readable medium storing thereon computer executable instructions for collecting log files for error reports, including instructions for:
detecting an error in a software component;

in response to detecting the error, retrieving a function call trace comprising a sequence of functions executed in the software component within a period of time prior to the error;

comparing the retrieved function call trace with a plurality of known call traces, wherein each respective known call trace of the plurality of known call traces is associated with a respective set of log files to be collected for error analysis;

identifying, based on the comparison, a known call trace for which a similarity value with the retrieved function call trace is greater than a threshold similarity value;

collecting a set of log files for the error based on an associated set of log files for the known call trace; and generating an error report comprising the collected set of log files.

18. The non-transitory computer readable medium of claim 17, wherein an amount of log files in the collected set of log files is less than an amount of total log files retrievable for the error for the period of time.

19. The non-transitory computer readable medium of claim 17, wherein an instruction for comparing the retrieved function call trace with the plurality of known call traces comprises an instruction for:

determining, for each respective known call trace of the plurality of known call traces, a respective similarity value using a comparison algorithm that accepts inputs comprising:
(1) positions of common functions in the respective known call trace and the retrieved function call trace, and
(2) differences in positions of common functions in the respective known call trace and the retrieved function call trace.

20. The non-transitory computer readable medium of claim 19, further comprising instructions for:

prior to comparing the retrieved function call trace with the plurality of known call traces, obtaining parameters of the comparison algorithm, wherein the parameters comprise an alignment offset weight, and the threshold similarity value.

\* \* \* \* \*